UNITED STATES PATENT OFFICE.

HARRY PAULING, OF GELSENKIRCHEN, GERMANY, ASSIGNOR TO THE FIRM SALPETERSÄURE-INDUSTRIE GESELLSCHAFT, G. M. B. H., OF GELSENKIRCHEN, GERMANY.

PROCESS OF ABSORBING DILUTE NITROUS GASES.

1,061,630.      Specification of Letters Patent.      Patented May 13, 1913.

No Drawing.      Application filed June 15, 1911. Serial No. 633,363.

*To all whom it may concern:*

Be it known that I, HARRY PAULING, a subject of the King of Prussia, residing at Gelsenkirchen, in the Kingdom of Prussia and German Empire, have invented a new and useful Process for Completely Absorbing Dilute Nitrous Gases, of which the following is a specification.

This invention relates to processes of absorbing nitrogen oxids; and it comprises a process wherein nitrous gases, such as the gaseous mixtures resulting from the treatment of air or other gas mixture containing nitrogen and oxygen in an electric furnace, are subjected to suitable oxidizing and absorbing treatment to obtain the bulk of the nitrogen oxids contained in said gases, the effluent gases from such treatment still containing unabsorbed nitrogen oxids are then treated in such a manner as to give a mixture of gases in which nitric oxid (NO) and nitrogen tetroxid or peroxid ($NO_2$) are present in relative proportions which enable such oxids to be quantitatively absorbed, such proportions being best substantially equimolecular, and the mixture of gases containing the oxids in adjusted proportions is treated with suitable absorbing agents to remove said oxids; all as more fully hereinafter set forth and as claimed.

The production of nitric acid and nitrates from atmospheric air is becoming of ever increasing importance, and processes designed to solve this problem and thus to replace Chili saltpeter as a source of nitric acid are considered more perfect, according as they result in more completely absorbing the nitrous gases, that is, gases containing nitrogen oxids or other nitrogen-containing reaction products, which, in all industrial processes of this kind heretofore known, are unfortunately of but weak concentration. The proportion of nitrogen oxids in the nitrous gases obtained by treating air or other gaseous mixture containing nitrogen and oxygen in an electric furnace does not ordinarily exceed a few per cent., the remainder of the mixture being largely free nitrogen together with some uncombined oxygen and possibly other gases. In the direct production of nitric acid and also in the production of nitrates from such nitrous gases, it has however been found to be very difficult in the absorption processes usually employed to absorb all the nitrogen oxids. In the first place, on account of the progressively decreasing proportion and consequently increasing dilution of the nitrogen oxids in the gases owing to the absorption from the gases of the greater part of their contained oxids, the partial pressure of the nitrogen oxids, and hence also their tendency to dissolve, become less and less as the absorbing process continues. Thus a point is reached where $NO_2$ (nitrogen tetroxid) is, by reason of its small partial pressure, only difficultly soluble, although at greater concentrations it is soluble with comparative ease. Furthermore the dissolving reaction of $NO_2$ yields NO (nitric oxid) which is relatively insoluble under the conditions of the absorbing process. Moreover the nitric oxid originally present in the mixed furnace gases is not, as a rule, completely oxidized to $NO_2$, so that after the absorption of the major portion of the valuable gases, a certain not inconsiderable part of the nitric oxid originally present is still in a non-oxidized condition and not absorbable. Heretofore practically the only method of overcoming the stated difficulties was to permit the residual gases coming from the main absorption to remain for some time in a very large space under oxidizing conditions until the lower and relatively insoluble oxids of nitrogen become oxidized to $NO_2$ which was then further treated with the necessary wet agents, in order to be absorbed. Now it has been found that the absorption takes place very much more quickly when the oxidation of the lower oxids in the residual gases is carried to a point short of that at which all the NO is converted into $NO_2$, and advantageously this conversion is so regulated that only about half the NO or nitric oxid is oxidized. The relative proportions of NO and $NO_2$ in the resulting gaseous mixture are thus substantially equimolecular, and in such proportions the oxids are practically quantitatively absorbed by an alkaline solution, such as soda, sodium hydrate, or the like, with the formation of alkali nitrite. The use of this reaction renders it possible to employ a comparatively small oxidizing chamber for the residual gases before mentioned.

In a typical embodiment of the present process, the nitrous gases or mixture of gases containing nitrogen oxids, such as the furnace gases resulting from the treatment of air by means of an arc in a nitrogen-burning furnace, are first suitably treated in a large oxidizing chamber and are then passed through an absorption apparatus in contact with a suitable absorbing agent, such as water or an alkaline solution where the bulk of the oxids are absorbed. The effluent gases, containing more or less undissolved nitrogen oxids diluted by a large proportion of accompanying diluent gases, are then treated to render the proportions of NO and $NO_2$ present such as will give a quantitatively absorbable mixture of the said oxids. For this purpose these effluent or residual gases are mixed with proper quantities either of non-oxidized furnace gas, or of completely or nearly completely oxidized gas obtained from the oxidation chamber, the selection of the gas to be added depending upon the character of the residual gases. The mixture thus obtained is then subjected to treatment with alkaline absorbing agents whereby the nitrogen oxids are substantially completely absorbed with the production of nitrites.

Instead of alkaline absorptive agents other similarly acting agents can of course be employed, such as sulfuric acid, which also takes up an equimolecular mixture of NO and $NO_2$, or $N_2O_3$ direct. In general, any absorbing agent having a similar action is suitable. Where sulfuric acid is used as the absorbing agent it is denitrated in suitable apparatus after becoming saturated with $N_2O_3$ and is then again concentrated and used for repeating the absorption, the nitrous gases resulting from the denitration being simply led off to the main absorbing plant.

What I claim is:—

1. The process of quantitatively absorbing nitrous gases, which comprises oxidizing and absorbing said gases as far as possible, treating the remaining unabsorbed gases with gases adapted to produce with said unabsorbed gases a substantially equimolecular mixture of NO and $NO_2$, and absorbing said equimolecular mixture by means of suitable absorbing agents.

2. The process of quantitatively absorbing nitrous gases, which comprises oxidizing and absorbing said gases as far as possible, mixing the unabsorbed part of said gases with oxidized nitrous gases in such proportions as to produce a substantially quantitatively absorbable mixture of nitrogen oxids and absorbing said mixture by means of a suitable absorbing agent.

3. The process of absorbing oxids of nitrogen, which comprises absorbing the major portion of the nitrogen oxids from gases containing the same, adjusting the relative proportions of nitric oxid and nitrogen tetroxid in the gases remaining after such absorption to render such oxids substantially quantitatively absorbable, and absorbing such oxids after such adjustment.

4. The process of absorbing oxids of nitrogen, which comprises absorbing the major portion of the nitrogen oxids from gases containing the same, treating the gases remaining after such absorption to obtain gases comprising nitric oxid and nitrogen tetroxid in substantially equimolecular proportions, and absorbing such oxids from the gases so obtained.

5. The process of absorbing oxids of nitrogen from gases containing the same in relatively very small proportions, which comprises mixing with such gases other gases containing oxids of nitrogen to obtain a mixture comprising nitric oxid and nitrogen tetroxid in such relative proportions that both said oxids are substantially completely absorbable from said mixture, and absorbing said oxids from the mixture thus obtained.

6. The process of absorbing oxids of nitrogen which comprises treating gases containing said oxids in relatively very small proportions to produce a mixture in which nitric oxid and nitrogen tetroxid are present in substantially equimolecular proportions and absorbing the oxids from the mixture thus produced.

7. In the art of absorbing nitrogen oxids from nitrous gases resulting from the treatment of air or other gaseous mixtures comprising nitrogen and oxygen in an electric arc, the process which comprises treating such nitrous gases in such manner as to adjust the relative proportions of nitric oxid and nitrogen tetroxid present in said gases and render said oxids substantially completely absorbable therefrom, and absorbing said oxids by means of a suitable absorbing agent.

8. In the art of absorbing nitrogen oxids from nitrous gases resulting from the treatment of air or other gaseous mixtures comprising nitrogen and oxygen in an electric arc, the process which comprises treating such nitrous gases to obtain a mixture comprising nitric oxid and nitrogen tetroxid in approximately equimolecular proportions, and absorbing such oxids from the mixture thus obtained.

9. In the art of absorbing nitrogen oxids from nitrous gases, the process which comprises treating the gases obtained from a nitrogen-burning furnace in such manner as to change the relative proportions of the various nitrogen oxids present, and admixing the treated gases with sufficient untreated gases from a nitrogen-burning furnace to make the relative proportion of NO and $NO_2$ in the admixture substantially equimolecular.

In testimony whereof I have signed my name to this specification in the presence of two subscribing witnesses.

HARRY PAULING.

Witnesses:
RICHARD MERKEL,
LOUIS VANDORY.